(12) United States Patent
Fuertes et al.

(10) Patent No.: US 6,482,267 B1
(45) Date of Patent: Nov. 19, 2002

(54) PROCESS FOR THE CONVERSION OF STARCHY SUBSTANCES IN THE DRY PHASE

(75) Inventors: Patrick Fuertes, Lambersart (FR); Anne Lambin, Lomme (FR); Jean-Louis Dreux, Estaires (FR)

(73) Assignee: Roquette Freres, Lestrem (FR)

( * ) Notice: Subject to any disclaimer, the term of this patent is extended or adjusted under 35 U.S.C. 154(b) by 84 days.

(21) Appl. No.: 09/693,178

(22) Filed: Oct. 20, 2000

(30) Foreign Application Priority Data

Oct. 22, 1999 (FR) .............................. 99 13190

(51) Int. Cl.$^7$ .............................. C08B 30/12
(52) U.S. Cl. ............................. 127/33; 127/38
(58) Field of Search ................... 127/33, 38

(56) References Cited

U.S. PATENT DOCUMENTS

| | | | |
|---|---|---|---|
| 2,836,591 A | | 5/1958 | Durand et al. |
| 3,479,220 A | | 11/1969 | Ferrara |
| 3,692,581 A | | 9/1972 | Ferrara |
| 3,705,046 A | | 12/1972 | Speakman |
| 3,778,431 A | * | 12/1973 | Kightlinger et al. |
| 3,884,909 A | | 5/1975 | Kightlinger et al. |
| 3,901,725 A | * | 8/1975 | Bond et al. ............ 127/32 |
| 4,207,355 A | | 6/1980 | Chiu et al. |
| 4,499,116 A | | 2/1985 | Zwiercan et al. |
| 5,032,683 A | | 7/1991 | Dragner et al. |
| 5,766,366 A | | 6/1998 | Ferguson et al. |

FOREIGN PATENT DOCUMENTS

| | | |
|---|---|---|
| EP | 0 373 313 | 6/1990 |
| EP | 0 710 670 | 5/1996 |
| WO | WO 97/13788 | 4/1997 |

OTHER PUBLICATIONS

Abstract in English of FR 2 768 432 and EP 0 902 037 (Mar. 1999).

Patent abstracts of Japan, vol. (1996) n °7, JP 08 073502.

Wolfgang Gerhartz, "Ullmann's Encyclopedia of Industrial Chemistry—Amino Resins", 5$^{th}$ edition, vol. A2, p. 115 to 141 (1996).

Elvers Barbara, "Ullmann's Encyclopedia of Industrial Chemistry—Resins synthetic", 5$^{th}$ edition, vol. A23, p. 89 to 110 (1996).

Elvers Barbara, "Ullmann's Encyclopedia of Industrial Chemistry—Urea", 5$^{th}$ edition, vol. A27, p. 358 to 365 (1996).

O.B. Wurzburg, "Modified Starches: Properties and uses", M. S., CRC Presse.Inc.(1986) p. 20.

Patrick Fuertes and Ann Lambin, "Process for the Conversion of Starchy Materials, Converted Starchy Materials thus Obtained and Their Uses, Particularly in the Manufacture of Paper, Adhesives and Jellied Products", U.S. patent application Ser. No. 19/150,680 filed Sep. 10, 1998; pp. 1–24.

Patrick Fuertes, Anne nee Delmotte Lambin and Jean–Louis Dreux, "Process for Modifying Starchy Materials in the Dry Phase", U.S. patent application Ser. No. 09/563,036 filled May 1, 2000; pp. 1–23.

* cited by examiner

Primary Examiner—David Brunsman
(74) Attorney, Agent, or Firm—Henderson & Sturm LLP

(57) ABSTRACT

The invention relates to a process for the conversion of starchy substances including a chemical liquification stage and a stabilization stage, whether simultaneous or not, these two stages being carried out in the dry phase and using respectively:

a mineral or organic acid, permitting the liquification of the starchy substance at a water fluidity valued (WF) of at least 10, preferably at least 45, and an aldehyde compound, in particular a condensate between an aldehyde and a nitrogenous compound, capable of stabilizing said starchy substance.

21 Claims, No Drawings

PROCESS FOR THE CONVERSION OF STARCHY SUBSTANCES IN THE DRY PHASE

BACKGROUND OF THE INVENTION

This invention relates to a process for the conversion of starchy substances including stages of chemical liquification and stabilization carried out in the dry phase. It is also designed for the converted starchy substances obtained by this process, some of these substances also constituting new industrial products. Finally it relates to the industrial uses for these converted starchy substances.

By "chemical liquification", we understand here all operations which consist of subjecting a starchy substance to the hydrolyzing action of a chemical agent, for example an acid or (per)oxidant; said agent may be used in the form of a liquid, solid and/or gas.

By "chemical liquification in the dry phase" we understand here a chemical liquification such as that defined above, performed within a reaction mix (including the starchy substance) the humidity of which is in practice below approximately 25%, preferentially in the approximate range 6% to 22%.

Techniques in the dry phase differ from the methods in an aqueous medium which involve a much more dilute reaction medium, with formation of a starch milk, presenting a dry matter, which usually does not exceed 35% to 40%.

These methods of liquification in an aqueous medium, however, involve the use of an additional filtration stage which has the disadvantage of causing substantial losses in soluble materials, principally in damaged starch granules, solubilized molecules of starch and salts produced during the preliminary neutralization of the fluidified starch. This in turn results in a reduction of the output in fluidified starchy substances and an increase in the polluting capacity of effluents.

These disadvantages have contributed to the search for and introduction of processes of chemical liquification in the dry phase. Thus, U.S. Pat. Nos. 3,479,220 and 3,692,581 describe a process for chemical liquification of starchy substances (starches, flours) by bringing these substances into contact, at ambient temperature ($\approx$25° C.), with a concentrated mineral acid placed on a dry inert support and finely divided.

Patent EP 710.670 describes a process of continuous chemical modification by which a starch powder and a modifying agent, for example a hydrolyzing agent such as hydrochloric acid, are simultaneously introduced into a particular reactor (a "turboreactor"), the blade of which permits the almost instantaneous creation by centrifuge of a fine, dynamic and highly turbulent fluid layer of an intimate mix between the starch particles and the chemical agent.

The application for patent WO 97/13788 describes, in general terms, a process of chemical liquification of starches, performed in the dry phase and in a continuous fashion, involving the obligatory use, among other things, of a piston-type reactor ("plug flow reactor") and of reaction temperatures of at most 77° C. (170° F.). According to this patent, a very wide range of chemical agents with hydrolyzing action are recommended, the preferred agents being hydrochloric acid, particularly in its gaseous form, and sulfuric acid. However, no exact example of the preparation of a fluidified starch is actually detailed in this document.

The application for patent EP 902.037 in the name of the Applicant, for its part, gives an example of liquification in the dry phase, under typical residence time and temperature conditions, of native starches or cationic starches.

In any case, whether they are used in an aqueous medium or in the dry phase, the processes of chemical liquification permit the preparation of converted products with commonly researched physical and chemical properties such as, in particular, reduced intrinsic viscosity and viscosity on heating, the viscosity on heating being evaluable by the classic measurement of water fluidity (WF), which may be measured according to the method described in patents EP 373.313 and U.S. Pat. No. 4,499,116 using a STORMER® viscosimeter as recommended in "Modified Starches: Properties and Uses", O. B. WURZBURG, M. S., CRC Press, Inc, 1986, page 20, it being understood that the measurement of WF values above 90 is refined by an extrapolation of the WF curve as a function of the time taken for 100 revolutions according to a regression of type in (WF)=a+b×ln(t) (henceforward "equation (1)") and taking the details from the table in column 9 of U.S. Pat. No. 4,499,116 for a mass of dry starch of 13.20 g. The value of the equation coefficients (1) is 5.384 for a and −0.4080 for b with a correlation coefficient $R^2$ of 0.997. By way of an example, applying equation (1), when the time for 100 revolutions is 7.0 seconds, the water flow (WF) thus calculated is 98.5.

Among the other properties researched, we may name:
increased solubility on heating, and
increased gel strength and film strength.

One of the main technical and economical advantages of chemically-fluidified starchy substances is their ability to be used and processed, especially to be cooked, to very highly dry matter; this is due to their viscosity, which is much lower than that of native products.

This ability results in energy gains (smaller volumes of water to eliminate) and technological advantages which are turned to good account in industry. However, whatever their preparation process, chemically fluidified starchy substances usually involve the disadvantage of producing unstable glues, particularly glues which very significantly increase viscosity on cooling and/or during prolonged storage. This instability often shows as irreversible gelation or downgrading.

This is why we usually associate chemical liquification processes with stabilization reactions, and particularly with reactions of esterification, etherification or oxidation, with a view to rendering fluidified starchy substances useful industrially. They may in particular involve reactions of acetylation, hydroxypropylation or oxidation by bleach. Although effective, these processes have the disadvantage of causing considerable organic and/or saline pollution. Other methods aim to combine chemical liquification processes with cross-linking reactions.

Thus U.S. Pat. No. 3,705,046 describes the cross linking, in the aqueous phase, of a starch, either native or cationic, by the use of paraformaldehyde, and this, either at the time of its liquification or before, also in the aqueous phase, by hydrochloric acid. Taking into account the intended application (the finishing of textile fibers), the cross-linked/fluidified starch obtained should therefore be relatively little depolymerized and should still have a relatively high viscosity, i.e. a Brabender viscosity, measured at a rather weak dry matter ("MS") (10%), always above 200 Brabender units ("UB") and usually in the range of approximately 230 to 930 UB. Such viscosities correspond to limited WF values, i.e. below approximately 45, although the authors envisage the use of relatively large quantities of hydrochloric acid. The contents of this patent show in fact that to obtain the desired products the normality of the filtered reaction medium ("filtrate acidity") should be below 2 N and, in practice, should be in the range 0.05 to 0.30 N, corresponding overall to reaction pH of 1.3 at most.

In addition, it seems that the duration of the reaction must be long (usually in the range of 10 to 15 hours, even 24 hours according to example 1) to obtain the desired levels of cross-linking and depolymerization.

U.S. Pat. Nos. 3,778,431 and 3,884,909 describe the cross linking, in the aqueous phase, of a native or cationic maize starch using a cross-linking agent such as 1,3-dichloro-2-propanol, 1,4-dichlorobutene-2 or epichlorhydrin, prior to its liquification by hydrochloric acid, also in an aqueous medium.

However, such processes present, and even accentuate, the above mentioned disadvantages inherent in processes in the aqueous phase (reduction of output, increase in pollution load).

For their part, the above mentioned patents EP 710 670, WO 97/13788 and EP 902 037, which are much more recent, are not specifically concerned with combining a liquification stage and a cross-linking stage, apart from the fact that document WO 97/13788 mentions, without providing any details, the possibility that starch subjected to liquification ("starch source") had previously been modified by agents such as epichlorhydrin or phosphorus oxychloride (cf. page 3, lines 9–25 of said document).

OBJECTS OF THE INVENTION

It appears from the above that there is, to the Applicant's knowledge, no method of preparation of a liquefied and stabilized starchy substance, a method which at the same time:

permits the industrial preparation of highly fluidified products offering very good stability on cooling and/or during prolonged storage, does not involve, to do this, the obligatory use of large quantities of cross-linking or liquification agents, nor of long reaction times, is applicable to starchy substances of very different types or which are subsequently to be subjected to very varied chemical or physical modifications, is economical and in particular permits us to anticipate good yields of fluidified starchy substances, and is only slightly or not at all pollutant, and in particular does not cause substantial loss of soluble matter in effluents.

SUMMARY OF THE INVENTION

And the merit of the Applicant Company is that it has discovered, after numerous studies, that such a method might consist in the combination, in the dry phase, of a liquification stage and a special stabilization stage, the latter specifically using an agent selected from among the aldehyde compounds.

DETAILED DESCRIPTION

More precisely, this invention relates to a process for the conversion of a starchy substance comprising:

a chemical liquification stage in the course of which the starchy matter is subjected, in the dry phase, to the action of an agent selected from among the mineral acids, the organic acids and their mixtures, such that said starchy matter has a water fluidity (WF) of at least 10, and preferably of least 45, and a stabilization stage, whether or not occurring simultaneously with said liquification stage, in the course of which the starchy matter is subjected, also in the dry phase, to the action of an agent selected from among the aldehyde compounds and their mixtures.

By "mineral acids" we understand, among other things, all the mineral acids, in liquid and/or gaseous form, described in the prior art, in particular in application WO 97/13788 mentioned above.

By "organic acids", we understand the mono-, di- and tricarboxylic organic acids capable of strongly fluidifying, at least substantially, starchy matters in the dry phase. They may be, among others, citric, adipic or fumaric acids.

By "substantially fluidifying", it must be understood that said acid permits us to give the starchy matter a water fluid value of at least approximately 10. By "strongly fluidify", it must be understood that this WF value is at least approximately 45, more particularly in the range 50 to 90, and may even reach the value of 99.

In the context of this invention, a strong mineral acid such as hydrochloric acid in liquid and/or gaseous forms, sulfuric acid or a mixture of these acids may advantageously be used.

By "aldehyde compound", we understand most particularly compounds of all natures and origins, having one or more aldehyde functions and which, in an acid medium, are capable of condensing, polymerizing and/or reacting with the hydroxyl (OH) functions of starchy substances.

By way of example and as described in U.S. Pat. No. 2,836,591, formaldehyde may be used in an acid medium to repolymerize previously strongly depolymerized products which are non-granular and cold-soluble, such as starch hydrolysates with a DE (Dextrose Equivalent) in the range 5 to 40, in particular in the range 16 to 20. The conditions for obtaining these hydrolysates are not specified. In addition, the mineral acid used at the time of this conversion acts solely as a catalyst of polymerization and not at all of hydrolysis, the authors also taking maximum precautions (drying of hydrolysates by atomization, conversion in a dextrinificator, _) so that this conversion takes place with very little water, i.e. in a medium with a water content below 6%.

In view of this, the document is not at all interested in the possibilities of combining, particularly in the dry phase, a liquification stage with the special stage using formaldehyde, and in particular does not permit us to obtain any positive information about the possibilities of undertaking these two stages at the same time.

In the context of this invention, the aldehyde compound produced, whether or not at the same time as the chemical liquification stage, may be very varied in nature.

It may comprise non-polymerized aldehydes such as formaldehyde, acetaldehyde, isobutyraldehyde, crotonaldehyde, furfural, acrolein or glyoxal, or polymerized aldehydes, in either cyclic or non-cyclic forms, such as paraformaldehyde.

However, most advantageously, the aldehyde compound is made up of at least one condensate between at least one aldehyde and at least one nitrogenous compound. A certain number of these condensates are used for the preparation of products generically called "resins" or actually constitute such resins.

The preparation techniques, the physical and chemical features and the industrial applications of such condensates are, as an example, described in the work entitled "ULLMANN's ENCYCLOPEDIA OF INDUSTRIAL CHEMISTRY"—Fifth Edition—VCH, in particular in the following passages of said work:

Volume A2 (1985): "Amino Resins", pages 115 to 41,

Volume A23 (1993): "Resins, Synthetic", pages 89 to 110, and

Volume A27 (1996): "Reaction of Urea and its derivatives with aldehydes", pages 358 to 365.

Preferentially, the aldehyde compounds used, in the dry phase, as stabilization agents in accordance with this invention are made up of at least one condensate between at least one aldehyde and at least one nitrogenous compound selected from urea and its derivatives, melamine and its derivatives and any mixtures of at least any two of these products. They may in particular be urea-formalin or melamine-formalin type resins, such as those marketed, among others, under the names RESAMINE®, LYSPAC®, URECOLL®, KAURIT® or MADURIT®.

Most advantageously, they are urea-formalin resins.

By "stabilization stage", we understand, in particular, any method or process, physical and/or chemical, capable of improving stability on cooling and/or during storage of the starchy substance, in particular, capable of cross-linking, to a greater or lesser degree, said substance.

According to a first embodiment, the process which is the subject of this invention may be characterized in that the starchy substance is simultaneously subjected to the liquification and stabilization stages.

In the context of this invention the term "simultaneously" should not be considered as restrictive, but as excluding solely the situation in which the liquification stage on one hand and the stabilization stage on the other would not experience any contemporaneousness, even for a few minutes. This term "simultaneously" includes situations such as those:

the two stages begin at the same time but one ends before the other, or the two stages do not begin at the same time but end at the same time, or all of one stage takes place after the other has started but before the other ends, or one stage begins after the other has started but before the other ends.

According to another advantageous embodiment, said process is characterized in that the liquification and stabilization stages are carried out with quantities of acid(s) such that the pH (measured on a sample suspended in demineralized water, at a concentration of 35%), is above approximately 1.3, and preferably in the range 1.6 to 3.0.

This pH may advantageously be in the range 1.6 to 2.8.

Such pH values constitute another feature of the process of this invention, fundamentally distinguishing it from those developed from what may be learned from U.S. Pat. No. 3,705,046 discussed above.

They may notably be obtained by using a total quantity of strong acid(s), equal to a maximum of 0.5%, and in particular they may be obtained advantageously by using:

either 0.05 to 0.25% hydrochloric acid, or 0.1 to 0.5% sulfuric acid, these percentages being expressed in dry weights of acid(s) in comparison to the dry weight of starchy substance.

According to a preferential embodiment, we use:

either 0.05 to 0.2% hydrochloric acid, or 0.1 to 0.4% sulfuric acid.

It is important to emphasize that the process of the invention, which is characteristically carried out in the dry phase, permits us, if we wish, to obtain more fluidified starchy substances than those resulting from the above mentioned U.S. Pat. No. 3,705,046 using significantly smaller quantities of chemical liquification agents than those recommended in that patent.

According to another embodiment, the process which is the subject of the invention is characterized in that it uses a total quantity of the stabilization agent(s), i.e. of aldehyde compound(s) of below 1%, preferably in the range 0.01 to 0.95%, these percentages being expressed in dry weight of stabilization agent(s) in comparison to the dry weight of starchy substances. This quantity may advantageously be in the range 0.02 to 0.20%.

The above values also differ fundamentally from the quantities of paraformaldehyde actually exemplified in the above mentioned U.S. Pat. No. 3,705,046, i.e. 1%.

In addition to this, the process which is the subject of this invention, characteristically carried out in the dry phase, permits us to prepare the fluidified and stabilized starchy substances by using quantities of liquification agent but also of stabilization agent which are particularly low with regard to prior art, and therefore offer unquestionable economic and ecological benefits.

According to another embodiment, said process is characterized in that the liquification and stabilization stages, whether simultaneous or not, are carried out at a temperature in the range approximately 60° C. to approximately 180° C., and for a total duration in the range of approximately 2 minutes to approximately 8 hours.

These times may, in particular, be in the range 2 minutes to 6 hours depending, among other things, upon the reaction temperature, this being preferably above 100° C. when the acid used is by nature organic.

By "starchy substance" in the context of this invention, we understand all native starches, either natural or hybrid in nature, including those produced by genetic mutations or manipulations, together with all modified starches produced by chemical and/or physical modification, in one or more stages, from said native starches. The starches, either native or modified, may notably be produced from potato, from high amylopectin content potato (waxy potato), from maize, wheat, high amylose content maize, rice, peas or manioc (cassava), from sections or fractions which may be made or obtained such as amylose, amylopectin, the granulometric sections known to a person skilled in the art under the terms wheat starch "A" and wheat starch "B", and any mixtures of at least any two of the above mentioned products. Starchy substances which may be used according to the invention may also be flours or other mixtures containing starch(es) and vegetable protein(s), the "starch(es)" component being the major constituent, as well as all products of the chemical and/or physical modification, in one or more stages, of said flours and said mixtures.

According to one embodiment, the native or modified starch of which the starchy substance or its content is composed is largely presented in granular form.

According to another embodiment, the conversion process for starchy matters according to the invention is characterized in that the starchy substance subjected to possibly simultaneous stages of chemical liquification and stabilization is selected from among native starches and flours, as well as products resulting from etherification, esterification, sulphonation, oxydation and/or plastification, and in particular of cationisation, hydroxyalkylation or acetylation of the above starches and flours.

In particular it has been established that said starchy substance may advantageously be cationic.

The process according to the invention also offers the advantage of being able to be carried out using non-specific equipment, notably agitating or plug flow reactors which vary greatly in their geometry, dimensions and modes of operation, including those described in patents EP 710 670 and WO 97/13788 mentioned above.

In view of this, from now on we have available to us a new, remarkably simple, inexpensive and competitive method of obtaining substantially or highly fluidified and stabilized starchy matters with wide ranges of applicable physical and chemical properties.

In fact, these starchy substances usually have a relatively weak "S index", said index being inversely proportional to the stability on cooling of such substances. More precisely, the S index of a starchy substance is equal to the relationship between the BROOKFIELD viscosity at 20° C. and 100 revolutions per minute (henceforth "V 20° C.") and the viscosity at 80° C. and 100 revolutions per minute ("V 80° C.") of the starchy substance presenting in the form of a glue with 15% dry matter (MS), obtained from a suspension with an initial MS of 25%, cooked for 3 minutes in a jet-cooker at 145° C. and diluted to 15% MS.

The conversion process according to the invention permits, among other things, the obtaining of products which simultaneously present a water fluidity (WF) of at least approximately 45 and in particular in the range of approximately 50 to approximately 90, and an S index as defined above of approximately 30 at most, preferably of 10.

Most particularly, it permits the conversion of starchy substances other than native waxy maize starches in products which present at the same time:

a water fluidity (WF) in the range approximately 50 to approximately 90, and an S index in the range 1 to 5.

Said S index may, in particular, be characterized by a value lower than 3.5, being situated notably in the range 1 to 3.

To the Applicant's knowledge, products obtained in the dry phase and fluidified and stabilized in this way constitute new industrial products which may advantageously be used in the operations of coating or surfacing paper, in the sizing and finishing of textiles and particularly as film-forming agents, binding agents, fiber fixers and/or water retainers. These new fluidified/stabilized starchy substances may also be used as texturing agents, in particular as viscosifiers or thickeners in the preparation of gums or gel products for use in foods, pharmaceuticals or cosmetics, or even as adhesives or texturing agents in the manufacture of plaster sheets or corrugated cardboard.

According to an advantageous embodiment, these products are presented, as in the case of the starchy substances from which they are produced, in a form which is principally granular.

All of the starchy substances described above may also be advantageously cationic (even amphoteric) and have, for example, a fixed nitrogen rate in the approximate range of 0.1 and 3% (dry weight/dry weight).

This invention will be described in an even more detailed manner with the aid of the examples which follow and which are in no way restrictive.

EXAMPLE 1

In this example, we are converting a native starchy substance, in this case a native maize starch at 13% humidity, in the milk phase, in accordance with example 1 of the U.S. Pat. No. 3,705,046 referred to above. We therefore use, at approximately 54° C. (129° F.), a maize starch milk (milk with 35.5% MS) the pH of which is adjusted to 8.3 with a solution of sodium carbonate and then 1%, expressed in relation to the dry weight of starch, of paraformaldehyde. After 90 minutes' contact, the pH of the milk is adjusted to a value of 2.2 by the addition of hydrochloric acid. After agitation, the reaction medium is maintained for 17 hours at 54° C. so as to ensure the cross-linking of the starch, then acidified with hydrochloric acid (0.67% in dry weight/starch dry weight) so that the acidity of the filtrate of said medium is in the order of 0.115 mol/l and its pH is below 1.0. Liquification as such is then effected over 24 hours at approximately 54° C. Following this, the resulting milk is neutralized, spun, washed and then dried according to example 1 of U.S. Pat. No. 3,705,046.

In spite of the high level of hydrochloric acid used and the very significant duration of the reaction, we note that the product obtained has a limited water fluidity (WF), namely a value of approximately 42. In addition, the "peak viscosity" and the "60-minute viscosity" of this product, measured according to U.S. Pat. No. 3,705,046, gives values (respectively 147 and 133 Brabender Units) of the same order but slightly lower than those described in example 1 of said patent (respectively 252 and 238 UB). The information provided by this patent does not therefore permit us to obtain highly fluidified cross-linked starches, i.e. having a WF of at least 45.

EXAMPLE 2

In this example, we are converting a starchy matter in the dry phase in accordance with the invention. We introduced into a high-speed mixer 40 kg of a native maize starch and then 0.13% (dry weight/dry weight) of hydrochloric acid together with 0.1% (dry weight/dry weight) of paraformaldehyde in the form of a solution in sodium carbonate. The homogenized reaction medium had a water content of approximately 15% and a pH of approximately 2.6, measured in the manner stipulated above. This was introduced into a ploughshare mixer heated to a temperature of approximately 80° C. After only approximately 4 h 35 min of reaction, the converted product obtained was removed from the reactor and neutralized by pulverization with a 4% sodium solution.

Measurement of the water fluidity (WF) of this product gave a value of approximately 73 which represents a high level of liquification.

In addition, the stability of this product has been verified by examination, at different temperatures, of the BROOKFIELD viscosity (rotational velocity: 100 revolutions per minute) of a glue with 15% dry matter (MS) obtained from an initial 25% suspension of MS cooked for 3 minutes in a jet-cooker (145° C.) and diluted.

Results obtained show very high stability of this product, the viscosity of which increases in a regular and limited manner in the range 80° C. (V80° C.=27 mPa.s) and 20° C. (V20° C.=120 mPa.s).

In addition, this has an S index, as defined above, (s=V20° C./V80° C.), of a particularly low value, namely approximately 4.4.

This example shows that the process which is the subject of the invention permits us, in a particularly effective way and notably without the obligatory use of high levels of cross-linking or fluidifying agents, or significant reaction times, to prepare on an industrial scale starchy substances which are substantially or high fluidified and also offer very good stability on cooling. In addition, these substances are able to preserve, as in this case, their principally granular form.

EXAMPLE 3

In this example, we are converting a native maize starch according to the process described in EXAMPLE 2 above except that, for each TRIAL A to I, we are modifying at least one of the following operating parameters: the nature of the starchy substance, the nature of the reactor, the nature and/or rate of introduction of the stabilizing agent, the nature and/or rate of introduction of the fluidifying agent, the reaction time.

TRIAL A: stabilizing agent=urea formalin resin of the "RESAMINE® HW 864" type (rate of introduction 0.1% in dry weight/dry weight of starch—cf. EXAMPLE 2); nature/rate of introduction in fluidifying agent: cf. EXAMPLE 2; reaction temp.: 88° C.; reaction time: 1 h 40 min.

TRIAL b; SAME AS TRIAL A except 1) nature/rate of fluidifying agent=0.30% sulfuric acid (dry weight/dry weight) 2) reaction temperature=approximately 90° C., 3) reaction time=1 h 40 min. and 4) water content of the medium: approximately 18.7%.

TRIAL C: SAME AS TRIAL B except 1) reaction temperature: 92° C. and 2) reaction time=50 min.

TRIAL D: SAME AS TRIAL A except 1) nature of stabilizing agent=urea-formalin resin of the "URECOLL® S" type 2) reaction temperature: 80° C. and 3) reaction time=2 h 06 min.

TRIAL E: SAME AS TRIAL D except 1) nature of stabilizing agent=urea-formalin resin of the "KAURIT® 285" type and 2) reaction time=1 h 50 min.

TRIAL F: SAME AS TRIAL E except 1) nature of stabilizing agent=melamine-formalin resin of the "MADURIT® MW 114" type and 2) reaction time=1 h 22 min.

TRIAL G: SAME AS TRIAL A except 1) nature of starchy substance=cationic maize starch (fixed nitrogen content: 0.15%), 2) reaction temperature: 80° C. and 3) reaction time: 2 h.

TRIAL H: SAME AS TRIAL A except 1) initial humidity of the reaction mix: 22%, 2) reactor of the turbo-reactor type as described in patent EP 710.670 referred to above, 3) temperature of thermal fluid: 110° C. and 4) reaction time: approximately 3 min.

TRIAL I: SAME AS TRIAL H except that the reaction mix does not contain any aldehyde compound.

We measured the water fluidity (WF) as well as the S index of each of the products obtained.

The results are summarized below:

| TRIAL | WF | S INDEX |
| --- | --- | --- |
| A | 99* | 2.1 |
| B | 99* | 2.3 |
| C | 78 | 2.9 |
| D | 69 | 4.1 |
| E | 70 | 5.7 |
| F | 69 | 23.1 |
| G | 59 | 3.4 |
| H | 68 | 4.7 |
| I | 70 | 60 |

*Value calculated with the aid of equation (1) referred to above.

These results globally confirm the benefit of the dry phase process according to the invention, which permits us to obtain, simply and economically, highly fluidified and highly stable starchy substances, some of which are, as previously indicated, new industrial products. We should note that such products, in particular those obtained with urea-formalin, are at least as stable as starchy substances fluidified to the same degree by bleach, which have the disadvantage of causing considerable chlorine pollution.

And it should be noted that such a result may be obtained by using:

- aldehyde compounds such as urea-formalin compounds, in weak proportions, in particular significantly lower than 1% (dry weight/dry weight), and/or
- acids such as strong mineral acids, in weak proportions, even those significantly lower than 0.5% (dry weight/dry weight), and/or
- relatively short or very short reaction times, in particular a maximum of 6 hours, for example in the range 3 minutes to 5 hours, and/or
- native and modified starchy substances, in particular cationic, and/or
- reactors, for example agitating, with great diversity of geometry, dimensions and modes of operation.

EXAMPLE 4

In this example, we are converting a maize starch in the milk phase (milk 37.5% of MS), using:

0.1% (dry weight/dry weight) of urea-formalin resin "RESAMINE® H 864", and hydrochloric acid in such a quantity that the pH of the milk is approximately 1.3.

After 14 hours of reaction at 51° C., the starch is neutralized, spun and dried to its original humidity (13%). The product obtained has a WF value of 72. However, it is found to be very unstable as its viscosity increases very greatly in the range 80° C. (52 mPa.s) to 20° C. (4700 mPa.s) giving an S index of approximately 90.

It therefore proves to be impossible to prepare, in the milk phase, starches which are simultaneously fluidified and stabilized.

What is claimed is:

1. A process for the conversion of a starchy substance comprising:
    a stage of chemical liquification in the course of which the starchy substance is subjected, in the dry phase, to the action of an agent selected from among the mineral acids, the organic acids and their mixtures, such that said starchy substance has a water fluidity, WF, of at least 10, and
    a stabilization stage, in the course of which the starchy substance is subjected, also in the dry phase, to the action of an agent selected from among the aldehyde compounds and their mixtures,
    wherein the starchy substance is simultaneously subjected to the liquification and stabilization stages.

2. The process according to claim 1, wherein in the course of the chemical liquification stage, the starchy substance is subjected, in the dry phase, to the action of an agent selected from among the mineral acids, the organic acids and their mixtures, such that said starchy substance has a water fluidity, WF, of at least 45.

3. The process according to claim 1, wherein the aldehyde compound is made up of at least one condensate between an aldehyde and a nitrogenous compound.

4. The process according to claim 3, wherein the nitrogenous compound is chosen from urea and its derivatives, melamine and its derivatives and their mixtures.

5. The process according to claim 1, wherein the liquification and stabilization stages are carried out with quantities of acid(s) such that the pH, measured on a sample suspended in demineralized water, at a concentration of 35%, is above 1.3.

6. The process according to claim 5, wherein the liquification and stabilization stages are carried out with quantities of acid(s) such that the pH, measured on a sample suspended in demineralized water, at a concentration of 35%, is in the range 1.6 to 3.0.

7. The process according to claim 1, wherein in view of the liquification of the starchy substance, the maximum total amount of acid(s) used is 0.5%, this percentage being expressed in dry weight of the acid(s) in relation to the dry weight of the starchy substance.

8. The process according to claim 7, wherein the maximum total amount of acid(s) used is made up of:

0.05 to 0.25%, when the acid is hydrochloric acid, or 0.1 to 0.5%, when the acid is sulfuric acid.

9. The process according to claim 8, wherein maximum total amount of acid(s) used is made up of:

0.05 to 0.2%, when the acid is hydrochloric acid, or 0.1 to 0.4%, when the acid is sulfuric acid.

10. The process according to claim 1, wherein in view of the stabilization of the starchy substance, we use a total quantity of aldehyde compound of less than 1%, this percentage being expressed in dry weight of the aldehyde compound(s) in relation to the dry weight of the starchy substance.

11. The process according to claim 10, wherein the total quantity of aldehyde compound used is in the range of 0.01 to 0.95%.

12. The process according to claim 10, wherein the total quantity of aldehyde compound used is in the range of 0.02 to 0.20%.

13. The process according to claim 1, wherein the liquification and stabilization stages are carried out:

at a temperature in the range 60° C. to 180° C., and for a total time in the range 2 minutes to 8 hours.

14. The process according to claim 13, wherein the total time is in the range of 2 minutes to 6 hours.

15. A starchy substance obtained according to claim 1, simultaneously having:

a water fluidity, WF, in the range 50 to 90, and an S index in the range 1 to 5.

16. A film-forming agent, binding agent, fiber fixer and/or water retainer comprising a starchy substance made according to the process of claim 1, in the processes of coating or surfacing paper, sizing and finishing textiles, as a texturing agent, in particular as a viscosifier or thickener in the preparation of gums, or gels used in food, pharmaceutical or cosmetic products, or as an adhesive or texturing agent in the manufacture of plaster sheets or corrugated cardboard.

17. The starchy substance obtained according to claim 1, that is cationic.

18. A film-forming agent, binding agent, fiber fixer and/or water retainer comprising a starchy substance made according to the process of claim 1 in the processes of coating or surfacing paper, sizing and finishing textiles, as a texturing agent, in particular as a viscosifier or thickener in the preparation of gums, or gels used in food, pharmaceutical or cosmetic products, or as an adhesive or texturing agent in the manufacture of plaster sheets or corrugated cardboard.

19. A starchy substance other than a native waxy maize starch, fluidified in the dry phase, simultaneously having:

a water fluidity, WF, of at least 10, and an S index below 3.5.

20. The starchy substance according to claim 19, simultaneously having:

a water fluidity, WF, in the range of 50 to 90, and an S index in the range of 1 to 3.

21. The starchy substance according to claim 19, that is cationic.

* * * * *